(12) United States Patent
Jain et al.

(10) Patent No.: US 9,665,826 B2
(45) Date of Patent: May 30, 2017

(54) AUTOMATED PROBLEM INFERENCE FROM BUG REPOSITORIES

(71) Applicant: Microsoft Corporation, Redmond, WA (US)

(72) Inventors: Navendu Jain, Seattle, WA (US); Rahul Potharaju, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 13/931,779

(22) Filed: Jun. 28, 2013

(65) Prior Publication Data

US 2015/0006519 A1 Jan. 1, 2015

(51) Int. Cl.
| | |
|---|---|
| G06F 17/30 | (2006.01) |
| G06N 5/02 | (2006.01) |
| G06F 11/36 | (2006.01) |
| G06F 17/27 | (2006.01) |
| G06Q 50/00 | (2012.01) |

(52) U.S. Cl.
CPC ......... *G06N 5/022* (2013.01); *G06F 11/3636* (2013.01); *G06F 17/2775* (2013.01); *G06F 17/2785* (2013.01); *G06F 17/3053* (2013.01); *G06F 17/30539* (2013.01); *G06F 17/30699* (2013.01); *G06F 17/30734* (2013.01); *G06Q 50/00* (2013.01)

(58) Field of Classification Search
CPC ........... G06F 17/30539; G06F 17/3053; G06F 17/30699; G06F 17/30734; G06F 11/3636; G06F 17/2775; G06F 17/2785; G06N 5/022; G06Q 50/00

USPC ................. 707/723, 776, 777, 754
See application file for complete search history.

(56) References Cited

U.S. PATENT DOCUMENTS

| | | | | |
|---|---|---|---|---|
| 4,322,813 A | * | 3/1982 | Howard | G03G 15/55 399/10 |
| 6,345,322 B1 | * | 2/2002 | Humphrey | G06F 11/3636 707/999.1 |
| 7,031,981 B1 | * | 4/2006 | DeLuca | G06F 3/0481 |
| 8,065,658 B1 | * | 11/2011 | Bali et al. | 717/113 |
| 8,442,940 B1 | * | 5/2013 | Faletti et al. | 707/610 |
| 2003/0028825 A1 | * | 2/2003 | Hines | G06F 11/2294 714/37 |

(Continued)

OTHER PUBLICATIONS

Abebe, Surafel Lemma, et al., "Towards the Extraction of Domain Concepts from the Identifiers", WCRE 2011, Limerick, Ireland, Oct. 17-20, 2011, pp. 77-86.*

(Continued)

*Primary Examiner* — Robert Stevens

(57) ABSTRACT

Aspects of the subject disclosure are directed towards automatically inferring the significant parts of bug reports, including by querying a knowledge base built by mining information from a large number of earlier bug reports. Common phrases in the earlier bug reports are filtered to provide a subset of phrases relevant to a bug domain, which are stored in the knowledge base and mapped to an ontology model of the knowledge base. When a new bug report is received for inference/analysis, the phrases therein are tagged based upon the ontology model, and the knowledge base queried with the tagged phrases to determine problems, activities and actions that are likely related to the new bug report.

20 Claims, 13 Drawing Sheets

(56) References Cited

U.S. PATENT DOCUMENTS

| | | | | |
|---|---|---|---|---|
| 2006/0040711 | A1* | 2/2006 | Whistler | H04W 24/00 455/566 |
| 2007/0168343 | A1* | 7/2007 | Best et al. | 707/5 |
| 2009/0254877 | A1* | 10/2009 | Kuriakose et al. | 717/105 |
| 2010/0228739 | A1* | 9/2010 | Helfman | G06F 17/30598 707/748 |
| 2010/0333067 | A1* | 12/2010 | Goh et al. | 717/121 |
| 2011/0185234 | A1* | 7/2011 | Cohen | G06F 11/3476 714/37 |
| 2012/0066217 | A1* | 3/2012 | Eder | 707/723 |
| 2012/0331439 | A1* | 12/2012 | Zimmermann | G06F 11/3604 717/101 |
| 2014/0201702 | A1* | 7/2014 | Kaplinger et al. | 717/101 |

OTHER PUBLICATIONS

Ding, Ying, et al., "Ontology research and development. Part I—a review of ontology generation", Journal of Information Science, © 2002 Chartered Institute of Library and Information Professionals15 pages.*

Li, Zhanjun, et al., "Ontology-based design information extraction and retrieval", Artificial Intelligence for Engineering Design, Analysis and Manufacturing, © 2007 Cambridge University Press, pp. 137-154.*

Park, Jinsoo, et al., "Evaluating ontology extraction tools using a comprehensive evaluation framework", Data & Knowledge Engineering, vol. 69, Issue, 10, Oct. 2010, pp. 1043-1061.*

Prieto-Díaz, Rubén, et al., "A Faceted Approach to Building Ontologies", IRI 2003, © IEEE 2003, Oct. 27-29, 2003, pp. 458-465.*

Schugerl, Philipp, et al., "A Quality Perspective of Software Evolvability Using Semantic Analysis", ICSC 2009, Berkeley, CA, Sep. 14016, 2009, pp. 420-427.*

Tran, Ha Manh, et al., "Evaluation of the Distributed Case-based Reasoning System on a Distributed Computing Platform", WAINA 2011, Biopolis, Singapore, Mar. 22-25, 2011, pp. 53-58.*

Würsch, Michael, et al., "Supporting Developers with Natural Language Queries", ICSE '10, Cape Town, South Africa, May 2-8, 2010, pp. 165-174.*

Schugerl, Philipp, "An Ontological Guidance Model for Software Maintenance", ESEC/FSE Doctoral Symposium '09, Amsterdam, The Netherlands, Aug. 25, 2009, pp. 29-30.*

Lal, Ronjeet, et al., "Error and Failure Analysis of a UNIX Server", HASE 1998, Washington, DC, Nov. 13-14, 1998, pp. 232-239.*

Pecchia, Antonio, et al., "Improving Log-Based Field Failure Data Analysis of Multi-Node Computing Systems", DSN 2011, Hong Kong, Jun. 27-30, 2011, pp. 97-108.*

Jain, Sourabh, et al., "Extracting the Textual and Temporal Structure of Supercomputing Logs", HiPC 2009, Kochi, India, Dec. 16-19, 2009, pp. 254-263.*

Beal, Vangie, "Computer Ontology", Webopedia, downloaded from: www.webopedia.com/TERM/C/computer_ontology.html on Sep. 9, 2016, 1 page.*

Schuegerl, Philipp, et al., "Enriching SE Ontologies with Bug Report Quality", SWESE '08, Karlsruhe, Germany, Oct. 26-28, 2008, 15 pages.*

Tappolet, Jonas, et al., "Semantic web enabled software", Web Semantics: Science, Services and Agents on the World Wide Web, vol. 8, Issues 2-3, Jul. 2010, pp. 225-240.*

\* cited by examiner

AUTOMATED PROBLEM INFERENCE FROM BUG REPOSITORIES

BACKGROUND

Virtually any sophisticated software or hardware contains bugs. Many large-scale software or hardware systems have bug repositories containing rich information that may be leveraged to improve system quality. These repositories contain bug reports (sometimes referred to as tickets) comprising structured data as well as relatively unstructured data including free form text, (e.g., tester logs, automated messages, email and IM conversations etc.), images, audio and so forth. Some bug reports are very large in size.

As a result, much of the rich data in bug repositories are not used in a number of ways that may be highly useful. For example, with bugs, many questions related to bugs as a trend or as a whole (as opposed to dealing with individual bugs) go unanswered, such as whether there is a particular part of code/functionality (e.g., concurrency, security, hardware-software interface, external dependencies) that exhibits recurrent bugs, whether there are bugs or bug types that are difficult to diagnose and troubleshoot, and so on.

Other examples of the bug report data that are not leveraged include data that may help find early problem symptoms of not-yet discovered or reported bugs. Patches/fixes can themselves contain bugs, with unknown impacts, and there may be dependencies that exist when fixing bugs. Successive software or firmware versions may have some new parts therein that improve quality, others that remain the same in quality, and others that introduce more bugs. Moreover, there are bugs that do not cause crashes, but cause fast energy drainage or reduced performance, for instance, in the case of software or applications running on mobile devices.

Bug repositories typically contain a lot of useful and rich information. However, it is difficult to perform automated problem inference on this information. Attempts have been made to automatically use some of the fixed field data in the bug reports, but much of the rich information is in the unstructured data that is part of the report, which goes unused unless and until manually reviewed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards identifying one or more occurrences of one or more phrases in bug reports, building a knowledge base based on these phrases and inferring their semantic, and later querying the knowledge base based upon the one or more occurrences of these phrases in a bug report. When queried, a query response corresponding to one or more concepts related to the bug report is received. The query report may be used to render output corresponding to the query response for use in analyzing the bug report.

In one aspect, a knowledge base is configured to store phrases that are mapped to classes of an ontology model. A query engine is coupled to the knowledge base, and a query interface is coupled to the query engine and a program interface. The program interface obtains one or more bug reports, from which one or more relevant phrases are extracted, and the knowledge based is queried based upon the one or more relevant phrases to locate information corresponding to the one or more relevant phrases. The information returned may be used for problem inference and/or analysis of the one or more bug reports.

One or more aspects are directed towards building a knowledge base, including processing bug reports having structured data and/or unstructured data, (e.g., text, images and so forth). A first subset of phrases is extracted from the bug reports based upon processing the structured data and/or unstructured data. Phrases that are not deemed relevant to a bug domain are filtered out to obtain a second subset of phrases. An ontology model is built, including mapping at least some individual phrases from the second subset to classes of the ontology model. The mapped individual phrases and the ontology model are stored in a knowledge base.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically inferring the significant parts of bug reports, by mining information from a large number of bug reports to build a structured knowledge base. In one aspect, once built, the knowledge base may be queried, such as for bug trend analysis, or for troubleshooting a newly discovered bug. Both structured (fixed) and free-form text in bug reports may be leveraged to identify exactly what component/entity (battery, login screen or the like) is being described in the structured as well as natural free-form text, and what problem is associated with that that component. Note that in many bug reports, this information cannot be accurately inferred from the structured data alone.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data mining and analysis in general.

Figure 1:
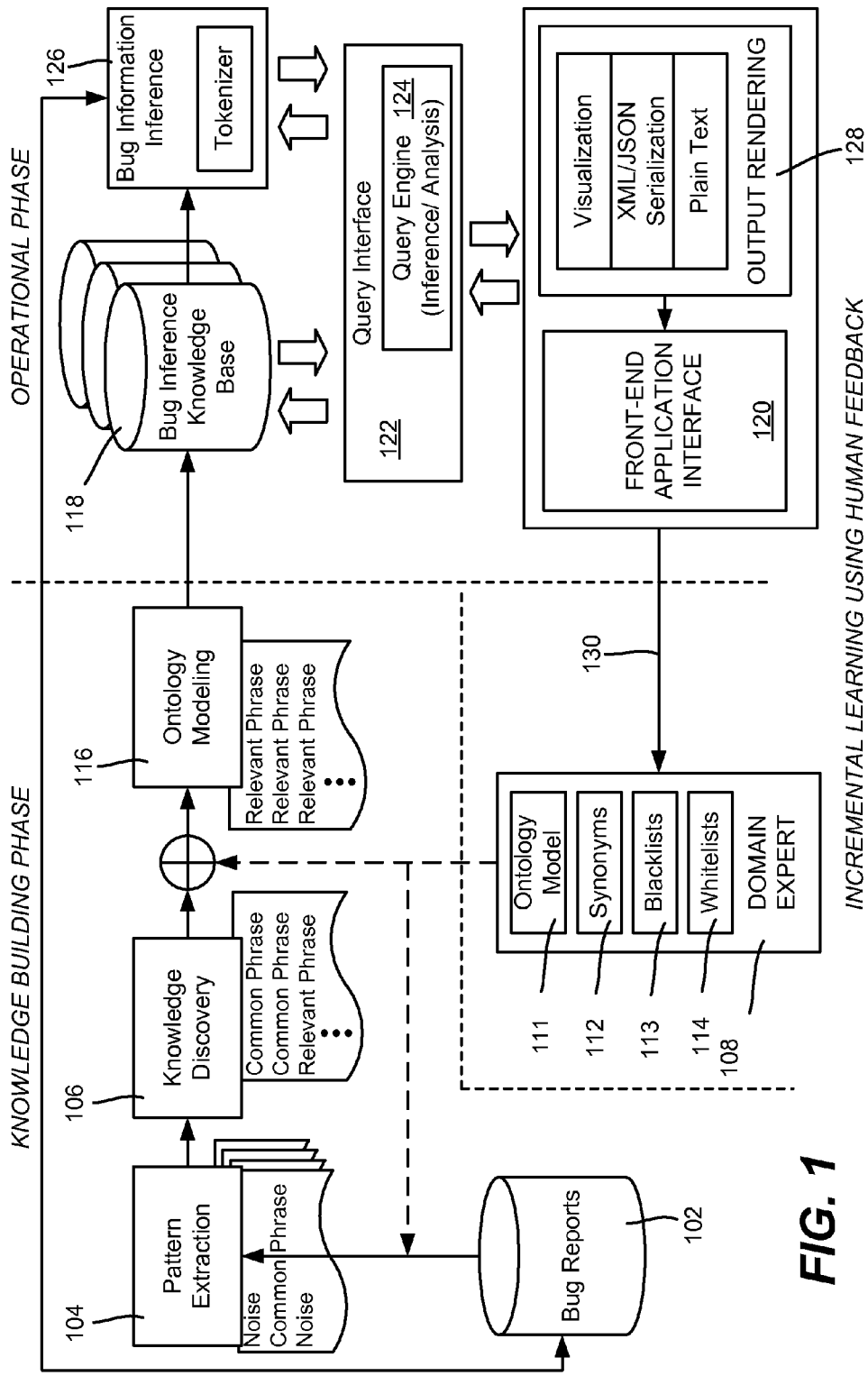
FIG. 1 is a block diagram representing example components of an architecture used for building and interacting with a bug inference knowledge base, according to one or more example implementations.

FIG. 1 shows an example architecture in which a typically large number of bug reports 102 are processed using various automated techniques (in conjunction with some manual and/or semi-automated techniques) to mine data therefrom. A first phase shown in the architecture of FIG. 1 is a knowledge building phase, and in general includes processing that may be performed to filter those phrases (one or more words generally, up to an entire sentence) that are relevant to bugs from those that are not. A tokenizer may parse and process multiple sentences together e.g., to determine Question and Answer (Q&A) pairs in the bug reports. In general, the freeform text in a bug report contains a lot of noise, e.g., phrases that have nothing to do with performing problem inference on the bug report. Example freeform text may be irrelevant statements (called noise) and other types of information such as crash/debug logs, email and IM conversations, and so forth (although such information may still have useful information for inference). To provide a more practical/workable number of relevant phrases that are important to do problem inference, in one or more implementations this noise is filtered out from the relevant content.

In general, over a large number of bug reports, certain sentences or parts thereof will be repeated many times. A pattern extraction component 104 can be configured to identify various phrases (e.g., sentences and/or n-grams) that consistently appear. For example, the phrases can be repeated patterns of language, e.g., n-grams of a suitable length or lengths that appear in multiple instances in the reports. Those phrases that appear frequently enough are kept, e.g., as evaluated against a percentage frequency and/or a phrase length threshold or some other suitable measure, while those that do not are filtered out. Note that while it is feasible to perform some pre-processing, such as to substitute synonyms and/or use other rules at this filtering stage (e.g., treat plurals as singular, remove capitalization) so that non-exact but highly similar phrases are considered the same as each other for purposes of frequency determination, in practice, with a sufficiently large number of bug reports, this is not always necessary to find the most commonly used phrases.

In one implementation, the pattern extraction component 104 only determines which phrases are consistently used, and does not perform any filtering based upon a technology domain. Instead, as represented in FIG. 1, a knowledge discovery component 106 performs this task.

More particularly, a given bug-related domain is associated with certain domain-specific phrases that are technically relevant. For example, one domain may be related to all software bugs, another may be related to all smartphone-related hardware bugs, another to all bugs of a particular vendor's operating system (e.g., all versions), and so on. The knowledge discovery component 106 uses a set of filters and/or a dictionary to determine which technically relevant phrases to keep for further use, and which to filter out. Note that single terms "e.g., Internet" may be a deciding factor in keeping a phrase, but n-grams may be more relevant, e.g., "Internet Explorer" is likely more relevant than "Internet" or "Explorer."

The knowledge discovery component 106 thus identifies a subset of the phrases that have relatively significant meaning in the domain. In addition to the set of filters or dictionary-based filtering, information provided by a domain expert 108 or the like may be used to determine which phrases to keep or which to drop. For example, information in an existing ontology model 111 and a synonym list 112 may be used in the decision making process. Blacklists 113 may be used to remove phrases that are otherwise technically relevant but contain a certain word or n-gram that is specifically identified, while whitelists 114 may do the opposite, e.g., keep a phrase that is to be otherwise dropped by the knowledge discovery component 106.

A next part of the knowledge building phase is ontology modeling 116. In general, ontology modeling 116 maps individual phrases from the subset of relevant phrases to classes of an ontology model, and stores the ontology model and the individual phrases in a knowledge base 118. For example, an individual (or team) such as a domain expert or developer may classify individual phrases into individual ontology classes and subclasses, e.g., "user interface" may be mapped into an entity class, or possibly a subclass of the entity class for more fine-grained mapping.

Figure 3:
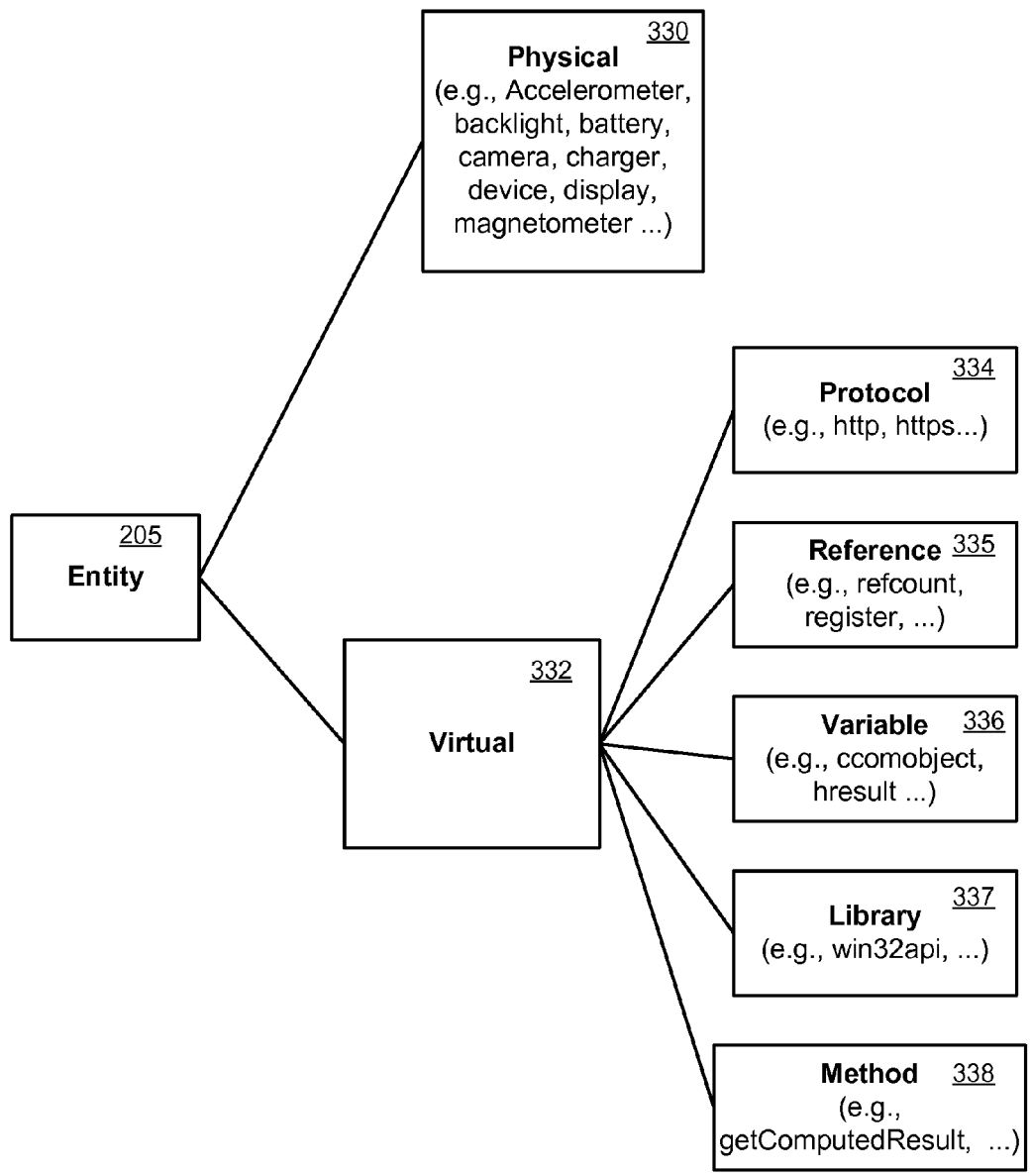
FIG. 3 is a representation exemplifying part of an ontology configured as a taxonomy, comprising an Entity class and subclasses thereof, according to one or more example implementations.
Figure 4:
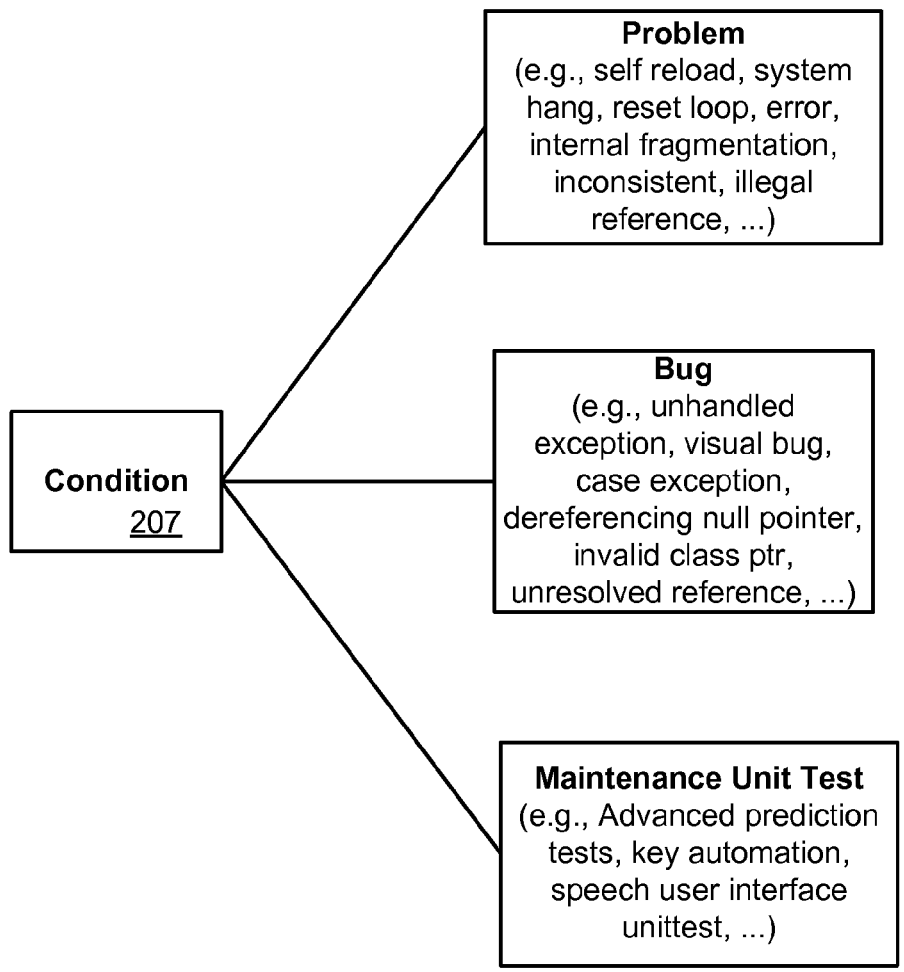
FIG. 4 is a representation exemplifying part of an ontology configured as a taxonomy, comprising a Condition class and subclasses thereof, according to one or more example implementations.

An ontology (e.g., the ontology 200 of FIG. 2) determines the "semantic interpretation" of the acquired domain knowledge for a domain. In one implementation, classes in the ontology are defined and arranged in a taxonomy, as generally shown in FIGS. 3 and 4, for example entity and condition classes, respectively. Allowed interaction (e.g., a syntax/grammar) among the classes is also defined, and is described below with reference to FIG. 2.

The following table sets forth example classes that may be used in an ontology related to bugs:

| | |
|---|---|
| Entity | "Thing" that exists |
| Actions | Behavior that can be caused upon an entity |
| Condition | Describes the state of an entity |
| Incident | Alters the state of an entity |
| Quantity | Describes the quantity of an entity/action |
| Negation | Negates a phrase |
| Sentiment | Adds strength/weakness to a phrase |

The ontology model can be constructed to relate the various ontology classes and subclasses according to defined interactions, and can be stored in the knowledge base 118. For example, during ontology modeling 116, individual phrases from the remaining post-filtered subset of relevant phrases can be mapped to the classes of an ontology model. The mapping of the phrases to the ontology model can be stored in the knowledge base 118.

However, certain remaining unfiltered phrases may not be suited for use within the ontology model because they may lack specificity relative to other phrases. For example, consider the unigram "handler" and the bigram "interrupt handler." The phrase "handler" may not be as useful as the phrase "interrupt handler" for the purposes of understanding a bug report, because the phrase "interrupt handler" is more specific and provides more context for semantic interpretation. For this reason, in some implementations, the domain expert or other individual can manually select from the post-filtering subset of phrases to identify phrases that are useful for mapping to the ontology model. For example, the domain expert or other individual may choose to assign the bigram "interrupt handler" to a particular class and/or subclass of the ontology model while dropping the unigram "handler."

Figure 2:
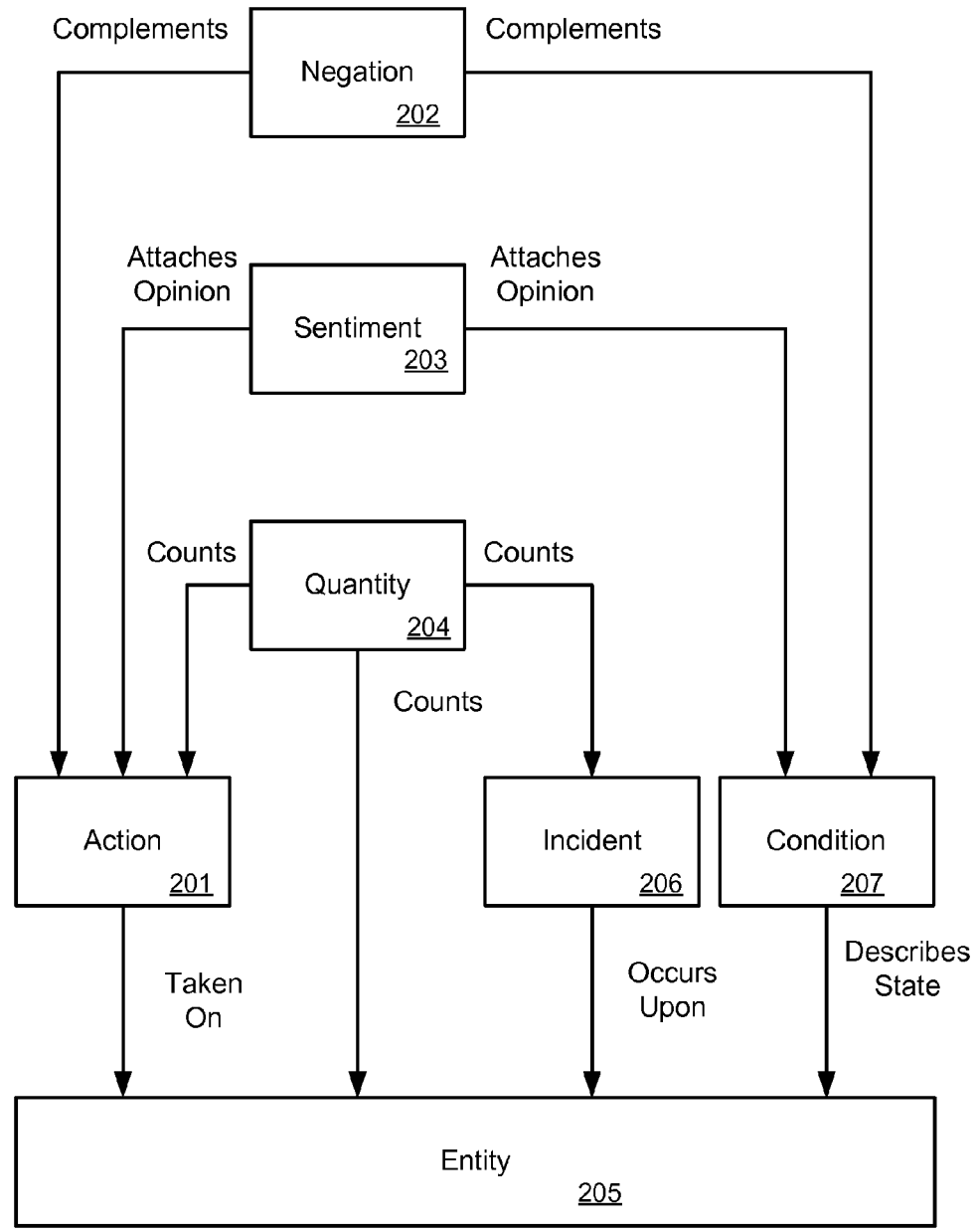
FIG. 2 is a representation of an ontology model and relationships among classes of the ontology model, according to one or more example implementations.

As represented in FIG. 2, an ontology model may be used to express relationships between the different classes, which can provide for concise expression of pertinent information included in the bug reports. In FIG. 2, an example ontology model 200 is shown that includes various classes and/or subclasses, where each class/subclass can have mapped to it one or more phrases and corresponds to some information provided by a document. In some implementations, the domain expert or other individual may select the particular class/subclass for each phrase, possibly assisted by a tool and/or partial automation.

The example ontology model 200 shown in FIG. 2 includes the classes from the above table, namely Entity, Actions, Condition, Incident, Quantity, Negation and Sentiment. Each class is represented by a corresponding node in FIG. 2, e.g., action node 201, negation node 202, sentiment node 203, quantity node 204, entity node 205, incident node 206, and condition node 207. As exemplified in FIGS. 3 and 4, subclasses are nodes below their respective class in an overall taxonomy.

Note that the arrows and labels show relationships between individual classes consistent with the ontology model. These relationships represent valid interactions between the ontology classes. For example, an action "taken" on an entity is a valid interaction according to the ontology model 200, as shown by the arrow connecting the action node 201 to the entity node 205. Conversely, an action "taken" on a condition would not be a valid interaction according to the ontology model 200 since there is no corresponding arrow illustrating such a relationship between the action node 201 and the condition node 207.

The Entity class 205 generally includes phrases that represent a "thing" that exists, as generally exemplified in FIG. 3. The entity class can include subclasses such as Physical subclass 330 or Virtual subclass 332. For example, a Physical Entity is a tangible object such as an accelerometer. A Virtual Entity is an intangible object such as a protocol (subclass 334), reference (subclass 335), variable (subclass 336), library (subclass 337) or method (subclass 338).

The Action class 201 includes phrases that represent a behavior that is taken on an entity. Subclasses of the action class can include those that interact with an entity and/or alter the state of the entity, such as PhysicalAction (e.g., replace, switch off, switch on, open, etc.), MaintenanceAction (e.g., update, upgrade, downgrade, etc.) and/or VirtualAction (e.g., install, wipe, copy, etc.) and so forth.

The Condition class 207 (e.g., FIG. 4) includes phrases that describe the state of an entity, e.g., an entity can have a faulty condition such as "illegal reference."

The Incident class 206 includes phrases that occur upon an entity and can alter the state of an entity. A subclass of the Incident class 206 may be FalsePositiveIncident, e.g., false alarm, etc.

The Quantity class 204 includes phrases that count or describe the quantity of an entity (e.g., two software builds), an action (e.g., detected twice), or an incident (e.g., two buffers overflowed). Some implementations may use LowQuantity, MediumQuantity, and HighQuantity subclasses to distinguish phrases that reflect relatively low, moderate, and high quantities depending upon the context. A quantity can also be used to reflect severity, e.g., LowQuantity can correspond to a relatively minor or low volume incident whereas HighQuantity can correspond to a relatively major or high volume incident.

The Negation class 202 includes phrases that negate another phrase, e.g., "did not reinstall the prior version." The negation class can include a SyntheticNegations subclass that uses verbs or nouns to negate a condition, incident or action, e.g., phrases such as "absence of," "declined," "denied," and the like. The Negation class 202 can also include AnalyticNegations subclass that uses "not" to negate a condition, incident or action.

The Sentiment class 203 includes phrases that add strength or weakness to an action or incident phrase, e.g., "I confirm that the race condition existed." The sentiments class can include a StrongSentiment subclass, e.g., phrases such as "confirm" or "affirmative" that denote certainty or high confidence. The sentiment class can also include a NeutralSentiment subclass, e.g., phrases such as "not sure." The sentiment class can also include a WeakSentiment subclass, e.g., phrases such as "unlikely" or "doubtful" that denote uncertainty or low confidence. Note that phases in the NegativeSentiment class can be phrases that may not explicitly indicate negative sentiment, but rather tend to be used by individuals when speculating about the nature of a bug.

Other classes may be present. For example, a Property class (VirtualProperty) may have data such as static, volatile, dynamic and so forth.

As set forth above, a domain expert or other individual can assign some or all of the phrases remaining in the post-filtered subset to one or more classes or subclasses of ontology model 200. In this way, the knowledge base 118 includes a mapping of various phrases in the bug reports to classes and/or subclasses of the ontology model.

As the domain expert or other individual selects the class/subclass assignments, the knowledge discovery component 106 can receive input from therefrom and update the discovery component 106 with these assignments for use when processing other bug reports. The domain expert also may provide a (e.g., custom-built) dictionary of synonyms 112 to collapse various synonymous terms into a standardized term. For example, the terms "browser," "Internet Explorer" and "IE10" may each mean the same thing in the context of a bug domain, whereby a dictionary entry can map each of these terms to "browser," for example. In some implementations, the knowledge discovery component 106 can process the existing bug reports to identify each instance of the synonyms/generalizations and replace them with a corresponding standardized term. Similarly, various phrases such as antonyms may be considered, as well as certain phrases on a whitelist or blacklist. In some implementations, the whitelist can identify phrases that the individual defines for inclusion in knowledge base 118 irrespective of their occurrences in the bug reports. Furthermore, in some implementations, the phrases on the whitelist are not mapped to synonyms or more general terms. Phrases on the blacklist may be excluded from the knowledge base 118 irrespective of their occurrences in the bug reports.

In sum, the bug inference knowledge base 118 thus includes a per-domain ontology arranged as a taxonomy of classes and subclasses, relationships between classes, and the phrases that are deemed relevant and mapped to the classes or subclasses. Note that there may be a global or universal ontology model, instead of (or in addition to) a per-domain ontology model; (where global or universal refers to at least two domains).

Figure 5:
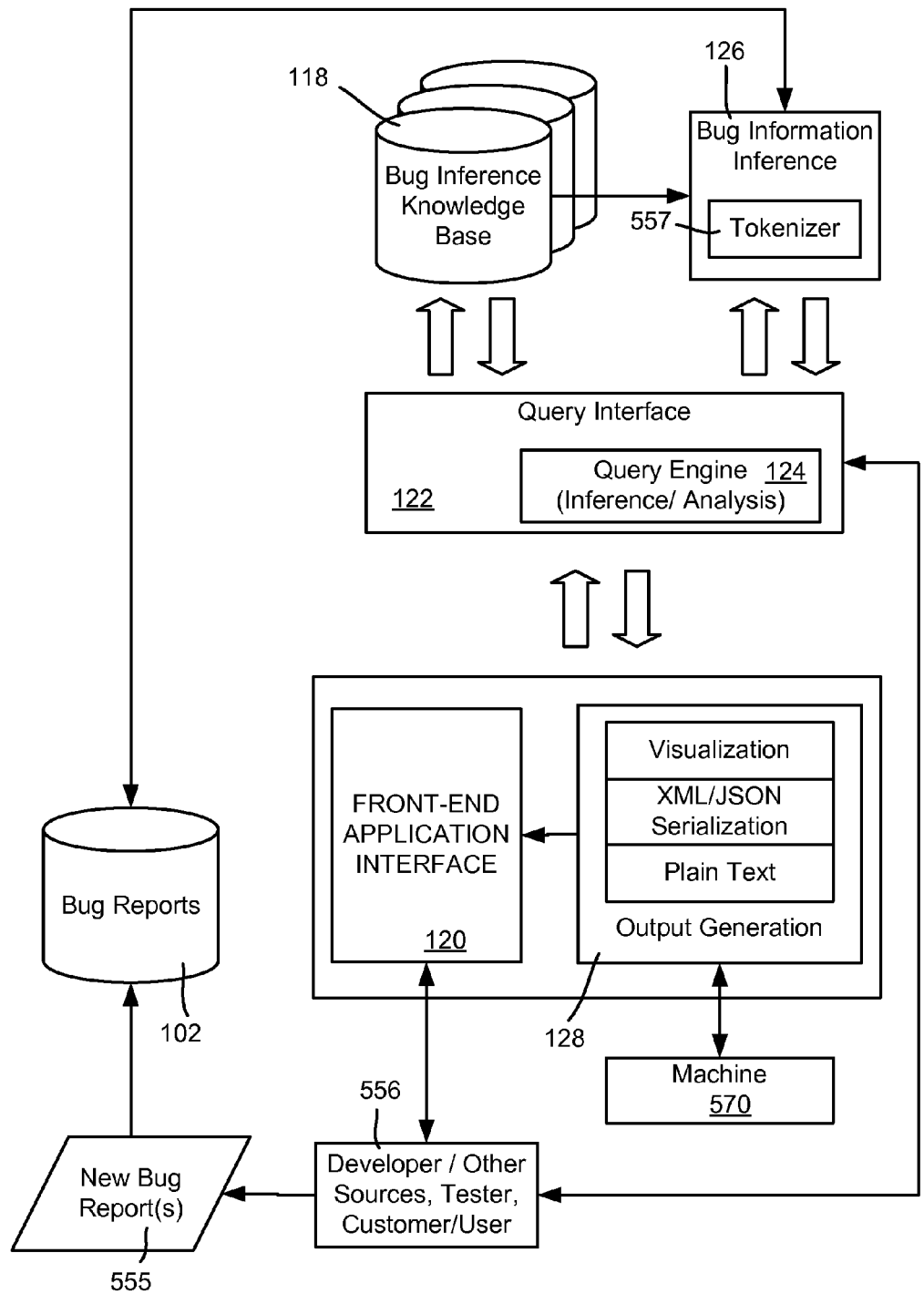
FIG. 5 is a block diagram representing example components for interacting with a bug inference knowledge base to infer information related to a new bug report from the knowledge base, according to one or more example implementations.

Turning to aspects related to usage of the bug inference knowledge base 118, the knowledge base 118 may be accessed to infer certain concepts expressed in bug reports. For example, as generally represented in FIG. 5, (which includes part of FIG. 1), when a new bug report 555 arrives, it gets placed into the bug report database 102; this can happen asynchronously whenever a new bug report arrives or can happen on-demand whenever the developer queries the system through a bug report ID (at which point the bug information inference module 126 communicates with the bug report database 102 to get the specific bug report and then invokes the tokenizer 557 (described below) and so on.

More particularly, when a developer/other source 556 queries the system using a bug report ID or the front-end interface 120, the request goes to the bug information inference module 126 which invokes the tokenizer 557 and infers the concepts as needed using information (e.g., by issuing any additional requests for information through 122) from the bug inference knowledge base 118.

The output from the bug information inference module 126 is communicated back to the developer/other source 556 through the output generation module. This output is rendered and visualized on the front-end if the request is through the front-end user interface or returned in other forms (e.g., XML/JSON, Plain text) if the request is automated (e.g., through API access).

Output generation may be to a machine 570 in addition to or instead of visible rendering. For example, machine learning algorithms in general can benefit from the output. Examples include clustering algorithms such as k-means, hierarchical clustering that can leverage the knowledge base and its generated output to generate high quality clusters. Algorithms relying on nearest neighbor search (or similarity computations, for example using cosine similarity) may leverage the technology's concept representation to get closer neighbors according to a similarity metric. Algorithms such as linear discriminant analysis (LDA) and latent semantic analysis (LSA) (focused towards building topic models that uncover certain hidden structure in data) can generate topic models with relatively less noise using the technology's concept representation.

The identified occurrences of the submitted phrases can be tagged according to corresponding classes of the ontology model 200. Input text such as "installing new version did not resolve user interface visual bug problem" can be mapped to the classes MaintenanceAction, Virtual Entity, AnalyticNegation and BugProblemCondition, and can result in tagged text such as: "(installing)/MaintenanceAction (new version)/VirtualEntity (did not)/AnalyticNegation (re-solve)/Action (user interface)/VirtualEntity (visual bug problem)/BugProblemCondition".

The tagged text of the bug report is processed to identify valid interactions according to the ontology model 200. Each sentence with at least one valid interaction can be identified. For example, some of the sentences in the individual bug report may have valid interactions and some may not have any valid interactions.

The sentences of the bug report 555 that do not have any valid interactions can be filtered out from further processing when analyzing the bug report, leaving a subset of sentences for further processing. Concepts can be inferred using contextual inference (FIG. 8), for instance, from the remaining subset of sentences. These concepts can be high-level and abstract such as Problems, Actions and Activities or low-level and specific such as Enumeration blocks or Question-Answer pairs.

Problems can identify a particular entity and associated state, condition, or symptoms (e.g., crash, reboot) as identified by, for example, a developer or a tester when the developer or tester, respectively, began troubleshooting. Activities can identify steps performed on the entity during troubleshooting of a problem, e.g., possibly including reproducing the problem or triage analysis steps performed before escalating the support ticket to higher levels of support. Actions can identify resolution actions ('ResolutionAction') performed on the entity to mitigate a problem. Note that ResolutionAction concept is distinguishable from the Action class of the ontology 200, e.g., ResolutionAction is an inferred meaning obtained from a given bug report, (whereas the Action class is a way of grouping certain phrases in the knowledge base 118). Enumeration Steps can identify a series of steps taken by the developer or tester to arrive at a resolution. Conversations or QA Blocks can identify a series of conversations between the developer or tester and the user who raised the bug report.

By way of example, problems may be generally related to the symptoms that existed when a bug was observed, e.g., a UI freeze. Problems relate entities to conditions as the syntax/grammar pattern, e.g., ReplaceableEntity|VirtualEntity|MaintenanceEntity preceded/succeeded by Problem-Condition|BugProblemCondition. A more particular example is (display)/ReplaceableEntity shows (null pointer exception)/BugProblemCondition.

Activities generally refer to steps taken to reproduce the problem, e.g., open login screen, click on "Start" . . . ; this may be exemplified as the syntax/grammar pattern: ReplaceableEntity|VirtualEntity|MaintenanceEntity preceded/succeeded by MaintenanceAction. A more particularly ontology-tagged example may be (upgrading)/MaintenanceAction fails and (ux)/VirtualEntity shows a (visual bug)/BugProblemCondition.

Actions generally refer to what did the software developer did to fix the problem, e.g., resolve concurrency race condition. This may be expressed as the syntax/grammar pattern ReplaceableEntity|VirtualEntity|MaintenanceEntity preceded/succeeded by PhysicalAction. A more particular tagged example is: (rewrite)/PhysicalAction the (device driver)/Virtual Entity.

Enumeration Steps generally refer to scenarios such as what a user did before observing the problem or what a developer did to resolve the problem. An example is: (1. Open browser, 2. Write the web address and enter an extra space, 3. Press Ctrl+Enter and the browser crashes).

Conversations or QA-Pairs generally refer to conversations between developers/testers and/or developers/testers/ users and provide additional debug information. An example is: (Q: Did you install the latest version? A: No. There was a problem installing it.)

Thus, in some implementations, certain grammar patterns may be matched to the tagged sentences to identify the concepts. For example, in the analysis, different grammar patterns may be used for each of the types of concepts, e.g., Problems, Actions, or Activities. The grammar patterns can be built using the classes or subclasses of the ontology model.

For example, consider a sentence "The driver was faulty" which can be tagged by the analysis component 206 as "The (driver)/ReplaceableEntity was (faulty)/ProblemCondition." Here, the analysis component can fit the tagged sentence to the Problem grammar pattern above because a driver (e.g., a ReplaceableEntity) is succeeded by the word faulty, which indicates a Problem Condition.

As can be readily appreciated, queries may be used for trend analysis. For example, a certain type of bug may occur more often than others, as detected by many new queries coming in for such a bug. As another example, some of the structured information may be maintained with the phrases that are stored in the knowledge base, or a separate filtering process may be used based upon the structured knowledge when building the ontology. Thus, for example, a trend may be seen in a new version by maintaining a knowledge base for that version.

Figure 6:
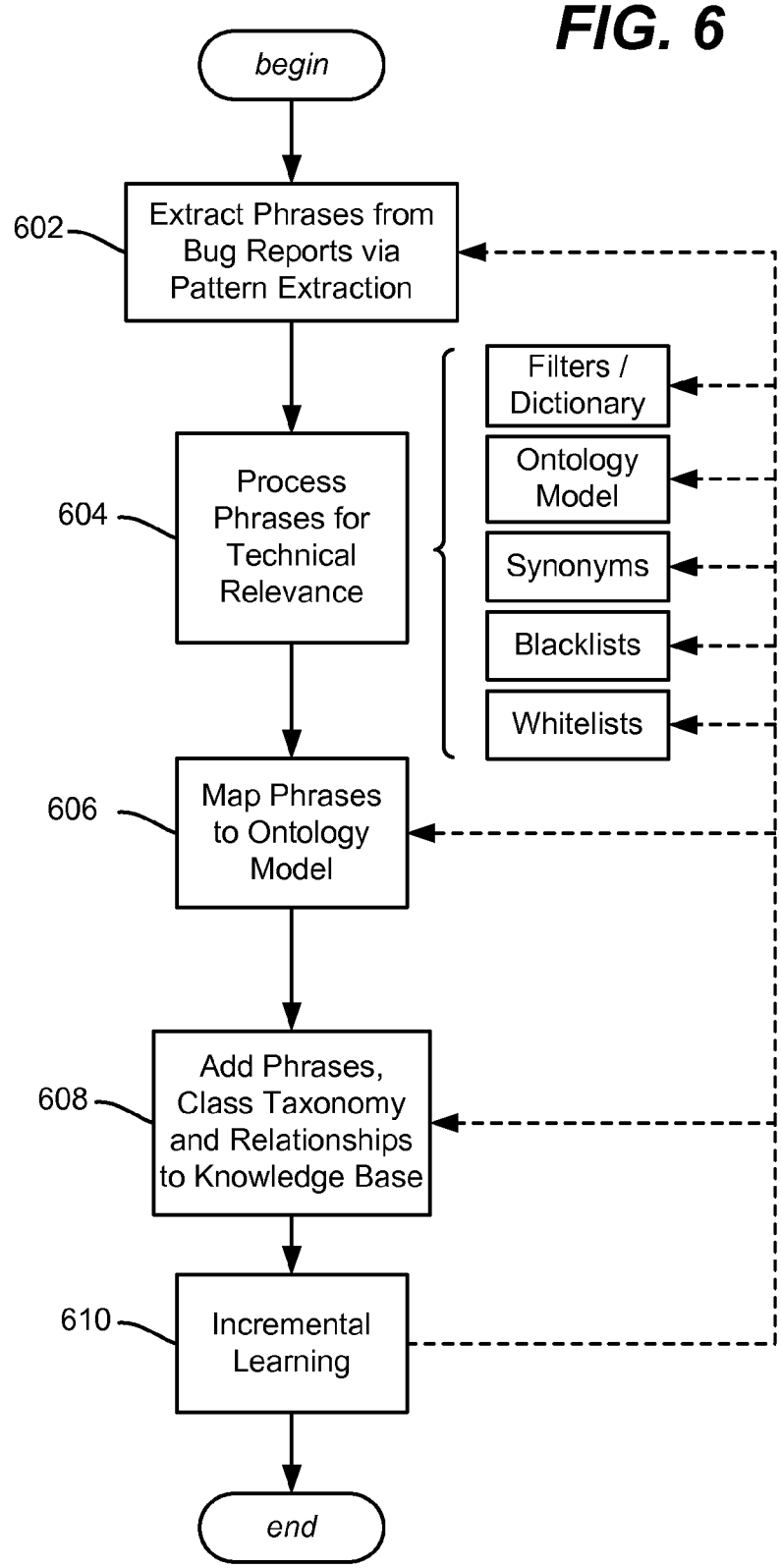
FIG. 6 is a flow diagram representing example steps for building a knowledge base, according to one or more example implementations.

FIG. 6 summarizes some of the example concepts in building a knowledge base, beginning at step 602 where bug reports are processed to extract those phrases that are relevant, e.g., those that occur frequently as determined via pattern mining. Step 604 represents filtering the phrases to obtain a subset of phrases having technical relevance to a domain. Filters and a dictionary may be used, e.g., using text from a current domain, a set of words/phrases are extracted to examine via pattern mining, taking into consideration any existing ontology model, synonyms (and possibly antonyms), blacklists and whitelists as described above.

Step 606 represents mapping the phrases to an ontology model configured for this domain, essentially building classes and a set of rules that define relevant concepts and relationships for a domain. Step 608 represents adding phrases and the ontology model (class taxonomy and relationships) to the knowledge base.

Step 610 represents the incremental learning. As described above and shown via the dashed arrows in FIG. 6, incremental learning may be applied to any appropriate step in the knowledge base building/updating process.

Figure 7:
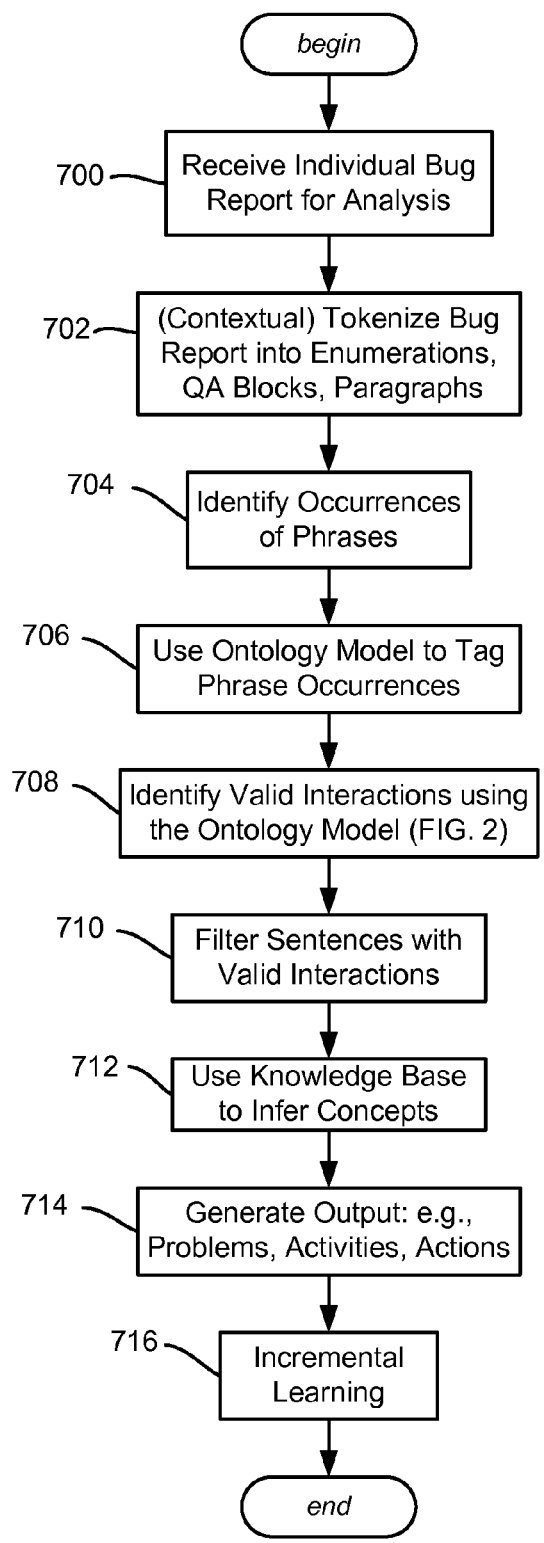
FIG. 7 is a flow diagram representing example steps for interacting with a knowledge base, according to one or more example implementations.

FIG. 7 is a flow diagram having example steps directed towards using the knowledge base together with the rules to extract relevant information (information inference) from the given input (e.g., a new bug report) received at step 700. As described below with reference to FIG. 8, at step 702 a contextual tokenizer may process the bug report into enumerations, question/answer block and paragraphs (where a paragraph may be a single sentence or multiple sentences, for example).

Step 704 represents identifying the occurrence of phrases in the new bug report, which may include filtering aspects and the like. Step 706 tags these occurrences based upon the ontology model as described above, which are then checked at step 708 to see if each corresponds to a valid interaction based upon the ontology model. Note that tagging may attempt to find the most fine-grained subclass that applies, e.g., the Entity class sub-tree of the taxonomy (FIG. 2) may be walked from the Entity node 205 towards the leaf nodes 444-446 to find a match to tag an entity in a phrase occurrence. Sentence (phrase) filtering at step 710 differentiates those that correspond to a valid interaction to keep from those that do not, which are filtered out; as described herein the ontology model not only models classes and subclasses, but valid interactions.

Step 712 uses the ontology model and rules to infer concepts, e.g., problems, activities, actions, steps take to find a solution, conversations (e.g., QA conversations) and/or possibly others. Step 714 generates the output in one or more suitable formats for analysis, as described herein. In this way, a developer can determine whether information in the knowledge base exists that may assist in fixing the new bug.

Step 716 refers to incremental learning, which may occur as individual new bug reports are received, or in a batch of bug reports (which is still considered "incremental" herein relative to the much larger amount of bug reports initially processed to build the knowledge base). In general, the domain expert evaluates the new bug report or reports against the knowledge base results to determine if changes can be made to improve the knowledge base 118, the knowledge discovery component 106, the ontology modeling 116 and/or any other domain knowledge (e.g., synonyms, blacklists, whitelists and so on) as generally represented by the feedback arrow labeled 130 in FIG. 1. This provides another aspect, shown as "incremental learning using human feedback" in FIG. 1. Note that the incremental learning may be applied anywhere in the knowledge building phase, as indicated by the dashed arrows from the domain expert 108 in FIG. 1.

Inference Through Contextual Tokenization

Figure 8:
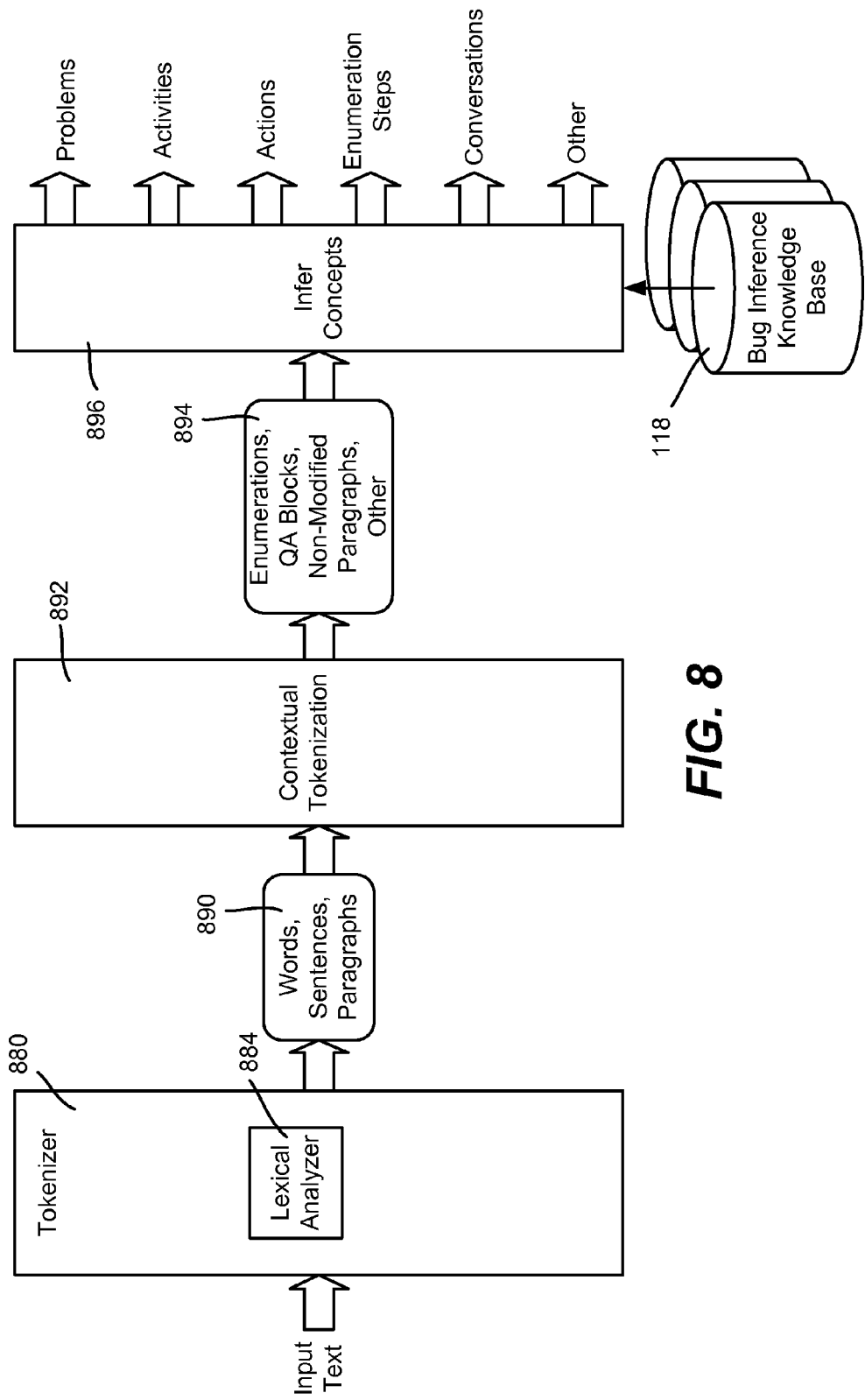
FIG. 8 is a representation of contextual inference via a tokenizer, according to one or more example implementations.

FIG. 8 shows an example related to contextual tokenization, including a tokenizer 880 comprising modules including a lexer plus tokenizer module 882 that parses input text from bug report (e.g., support ticket) data. In general, the tokenizer 880 tokenizes the given input according to standard tokenizers (e.g., sentence, word, paragraphs, etc.). For example, given input text, a lexical analyzer 884 produces tokens based upon fundamental abstractions defined through regular expressions, e.g.:

COMMA=','
PERIOD='.'
COLON=':'
QUESTIONMARK='?'
NEWLINE='\n'
WORD='[A-Za-z]'
. . . .

The output 890 of the tokenizer 880, e.g., words, sentences, paragraphs and the like are input into a contextual tokenization module 892.

The following rules are related to context free grammar in one or more implementations:

words: words WORD
|words NUMBER
|words COLON
|words COMMA
|words PERIOD
|WORD
|NUMBER A collection of words can be defined
as (read rules above in reverse):

| | |
|---|---|
| A single number | 1 |
| A single word | This |
| Anything above + PERIOD | end. |
| Anything above + COMMA | Instance, |

-continued

| A collection of words can be defined as (read rules above in reverse): | |
|---|---|
| Anything above + COLON | Example: |
| Anything above + another NUMBER | are 2 |

Enumeration rules include:
enumeration: NUMBER PERIOD words NEWLINE
|BULLET words NEWLINE
|BULLET NEWLINE

| Enumeration can be defined as (read rules on top in reverse): | |
|---|---|
| An empty bullet | • |
| BULLET + words and then a NEWLINE | • This is a bullet |
| NUMBER + PERIOD and then a NEWLINE | 1. This is a numeric bullet |

The contextual tokenization module 892 provides support to capture paragraphs (e.g., including individual sentences), question and answer (Q&A or simply QA) pairs, enumerations, XML tags, sentences of the form: "You should do this then do that then finally do this," and so forth. In one or more implementations, generic sentences and groups of sentences are marked with a label PARAGRAPH. Numbered or bulleted lists are grouped together and labeled as ENUMERATIONGROUP. Questions are recognized using a best-effort based approach, e.g., sentences are combined with other sentences ending with a question mark, and/or sentences ending with a question mark are labeled as QUESTION.

Other blocks that may be output Problem-Resolution pairs, Symptom-Resolution pairs, Parent-Child pairs (e.g., from XML data, forum posts etc.), Issue-Resolution pairs (e.g., from knowledge base articles etc.) and so forth. The output from the contextual tokenization module 892 is exemplified in FIG. 8 via block 894.

As described herein, concepts are inferred (block 896) from the output 894 of the contextual tokenization module 892. These may include problems activities, actions, steps taken to arrive at a solution, a conversation contained within the bug report, and so forth.

Generated Output Examples

Figure 9:
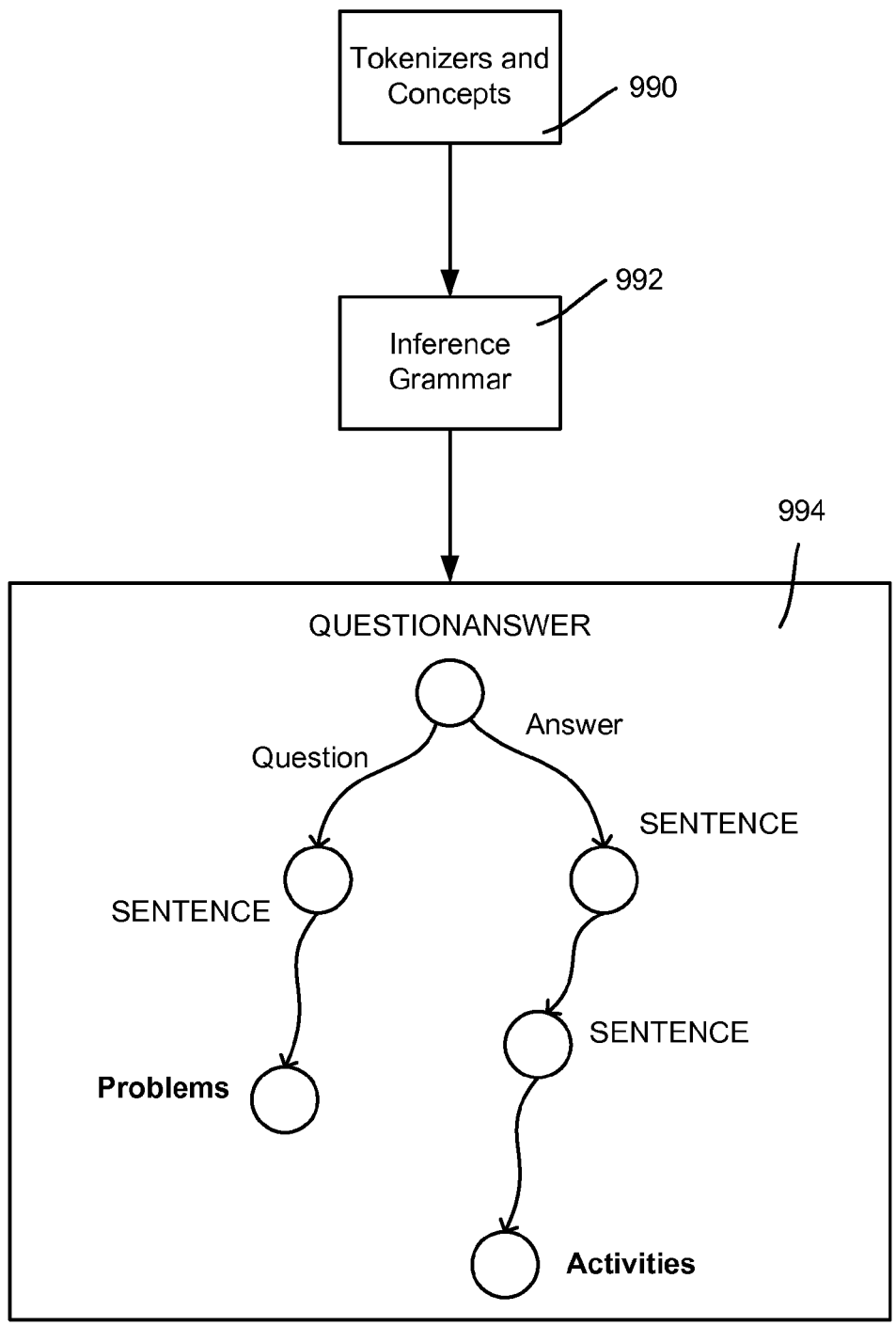
FIG. 9 is a representation of providing a question answer data structure via tokenizers and context, according to one or more example implementations.

FIG. 9 is a representation of how tokenizers and concepts (block 990) may be processed via inference grammar (block 992) into a QUESTIONANSWER data structure 994, e.g., for visualization. Tokenizers comprise individual sentences, Q&A Pairs, enumerations, XML Tags, etc. Concepts comprise problems, activities, actions, QA pairs, enumerations, etc.

In one or more implementations, the bug inference technology may be integrated into a datacenter troubleshooting architecture, whereby any new unseen ticket may be processed on-the-fly. To export the inference output, a variety of data formats such as XML and JSON may be supported; querying (e.g., FIG. 5) may be via the query engine or an API exposed through a REST interface. The output generation supports graphical visualization of inference output to perform bug report/ticket summarization and trend analysis on multiple bug reports/tickets.

During an operational phase, the system expects either a single ticket (for summarization) or a collection of tickets (for trend analysis). The latter can be specific through a list of predicates (e.g., device type, device model, data center, date range) based on which the collection of tickets will be narrowed down by the query engine.

Based on the type of input, there are different types of analysis of interest, as sifting through long tickets poses two challenges. First, it may take significant effort to understand the ticket, especially if the ticket contains millions of words. Second, it may cause unintended ambiguity in that different network operators may arrive at different conclusions reading the same ticket.

Figure 10:
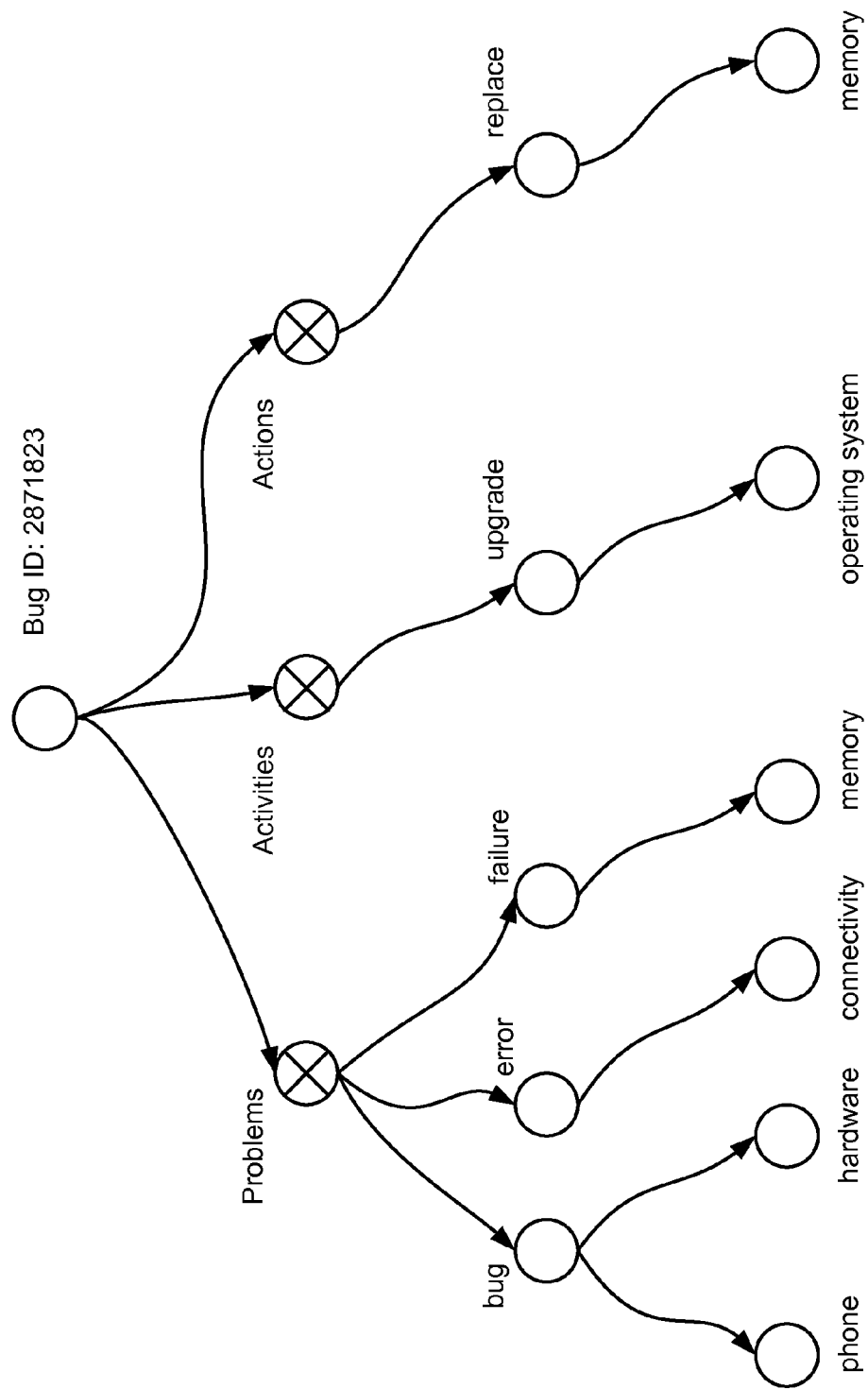
FIG. 10 is a representation of an example concept tree, providing for a hierarchical visualization of the problems that appear inside a bug report, according to one or more example implementations.

The system provides the ability to visually summarize a bug report to enable quick review by operators. A concept tree, shown in FIG. 10, is one example of a visible representation that maps the concepts into a tree. As can be understood, such hierarchical visualization provides for a rapid glance at the problems that appear inside a bug report. As can be seen in this example, at depth=1, the node represents a unique bug report identifier for quick reference. At depth=2, there are three distinct nodes representing various concepts (Problems, Activities, Actions). At depth=3, each node represents an action/condition describing an entity and at depth=4, each node represents a single entity connected to the parent action/condition. When rendered, such a tree can be read bottom-up starting from entities. Note that although not shown in FIG. 10, it is understood that such a rendering may be interactive, e.g., pointing at a node may highlight only neighboring nodes and thus contributes towards usability.

In one or more implementations, there are three considerations in rendering such a tree, including that node placement is non-overlapping, and that the tree is hierarchical with some notion of gravity that exerts a varying gravitational pull on nodes at different levels. Further, it is easy to examine any individual node, e.g., by interaction as described above. A Barnes-Hut approximation may be used as a layout algorithm to calculate the layout of the nodes

| Grammar | Interpretation |
|---|---|
| (SENTENCE:Problems) | 1. Tokenize using sentence tokenizer |
|  | 2. Perform inference for "Problems" |
| (QUESTIONANSWER | 1. Tokenize using QA tokenizer |
|    (SENTENCE:Problems,Resolutions) | 2. Then, tokenize using sentence tokenizer |
| ) | 3. Perform inference for "Problems" and "Resolutions" |
| (QUESTIONANSWER | 1. Tokenize using QA tokenizer |
|    QUESTION:(SENTENCE: | 2. For Questions: |
| Problems) |   A. Use a sentence tokenizer |
| ) |   B. Perform inference for "Problems" |
|    ANSWER:(LIST | 3. For Answers: |
|      (SENTENCE:Activities) |   A. Use a list tokenizer |
| ) |   B. Perform inference for "Activities" |
| ) |  |
| ... | ... | which are then placed onto an SVG (Scalable Vector Graphics) canvas, for example. Further, once the layout algorithm terminates, each node may be re-aligned based on its depth in the tree by giving it an additional downward gravitational pull.

With respect to trend analysis, network management involves decision making and inventory management, whereby a domain-expert may be interested in understanding the trend across certain dimensions. To help operators understand larger problem trends, trend analysis may be performed across specified dimensions, such as to establish "what are the major problems with components belonging to manufacturer X?" for example. Trait Charts may be used as a mechanism to support large-scale trend analysis across multiple dimensions by grouping information via predicates such as hardware model, operating system and software. Subsequently, in one or more implementations the data grouped across concepts may be rendered as bi-partite bubble plots where the left and right partitions represent different ontological classes. The size of each bubble is proportional to the number of bug reports in which the associated concept appears.

Figure 11:
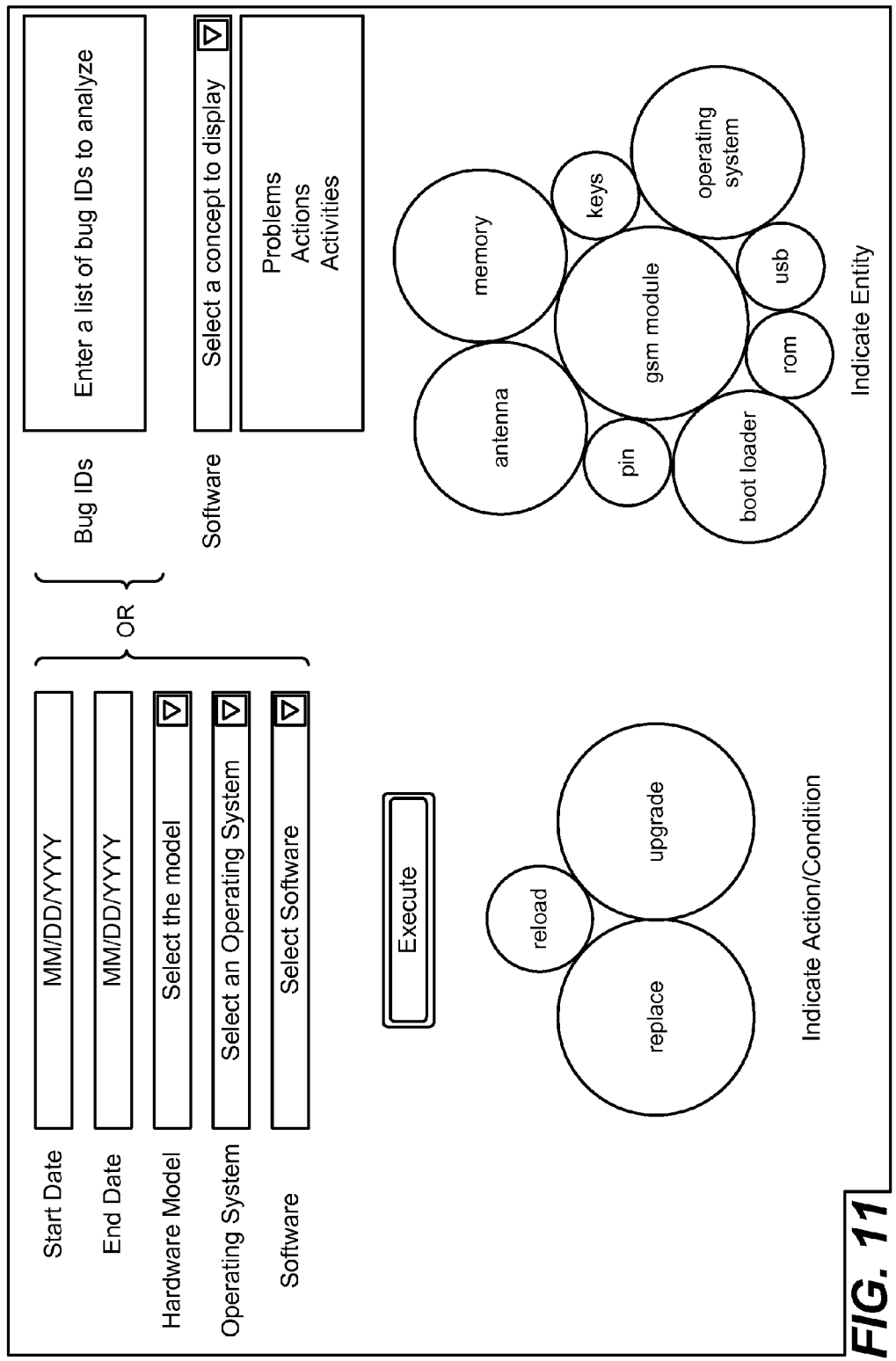
FIG. 11 is an example screenshot of a front-end interface that provides bug report summarization and trend analysis, according to one or more example implementations.

FIG. 11 shows one example implementation of Trait Charts (bi-partite bubble plots) presented to the user, for example. There are general considerations in rendering such charts, including that it is easy for a user to "glean" the big picture and understand the major problems, and that the approach is applicable to cases where there are large number of distinct problems, e.g., the visualization remains uncluttered irrespective of the scale of data.

As can be seen in the example of FIG. 11, a flexible front-end interface may be provided to bug report summarization and trend analysis. Such a front-end interface may be built using commonly available web technologies, for example. The visual interface provides an option for predicate selection (e.g., hardware model, operating system, software, etc.) and dynamically updates rendered charts based on the collection of bug reports retrieved by the query engine, for example. The radius of the bubbles in the charts may be computed as a function of the number of bug reports in which the associated concept appears.

In this example, the lower left side may be used to represent the condition/action associated with the entity which is depicted on the lower right. These charts may be interactive, e.g., when a user moves the mouse/pointer cursor over any node, detailed information about the bubble may be rendered through a non-intrusive popup.

As can be seen, bug inference using the technology described herein may be applied to answer questions related to what part of code/functionality (e.g., concurrency, security, hardware-software interface, external dependencies) exhibits recurrent bugs, including those hard to implement correctly the first time, and so on. Bug inference using the technology described herein may help determine which bugs are difficult to diagnose, and also how their troubleshooting can be improved. Bugs may be leveraged to find early problem symptoms of future bugs. The technology may establish what fraction of patches/fixes become bugs themselves, and what their impact is; similarly, across successive software releases, a careful comparison of what part of the code improved, remained the same or introduced more bugs may be performed. Dependencies (e.g., buffer size, data races, calling functions) may be highlighted when fixing bugs. For software running on phones, energy implications become important—bugs may not cause crashes, but manifest in fast energy drainage or reduced performance.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 12:
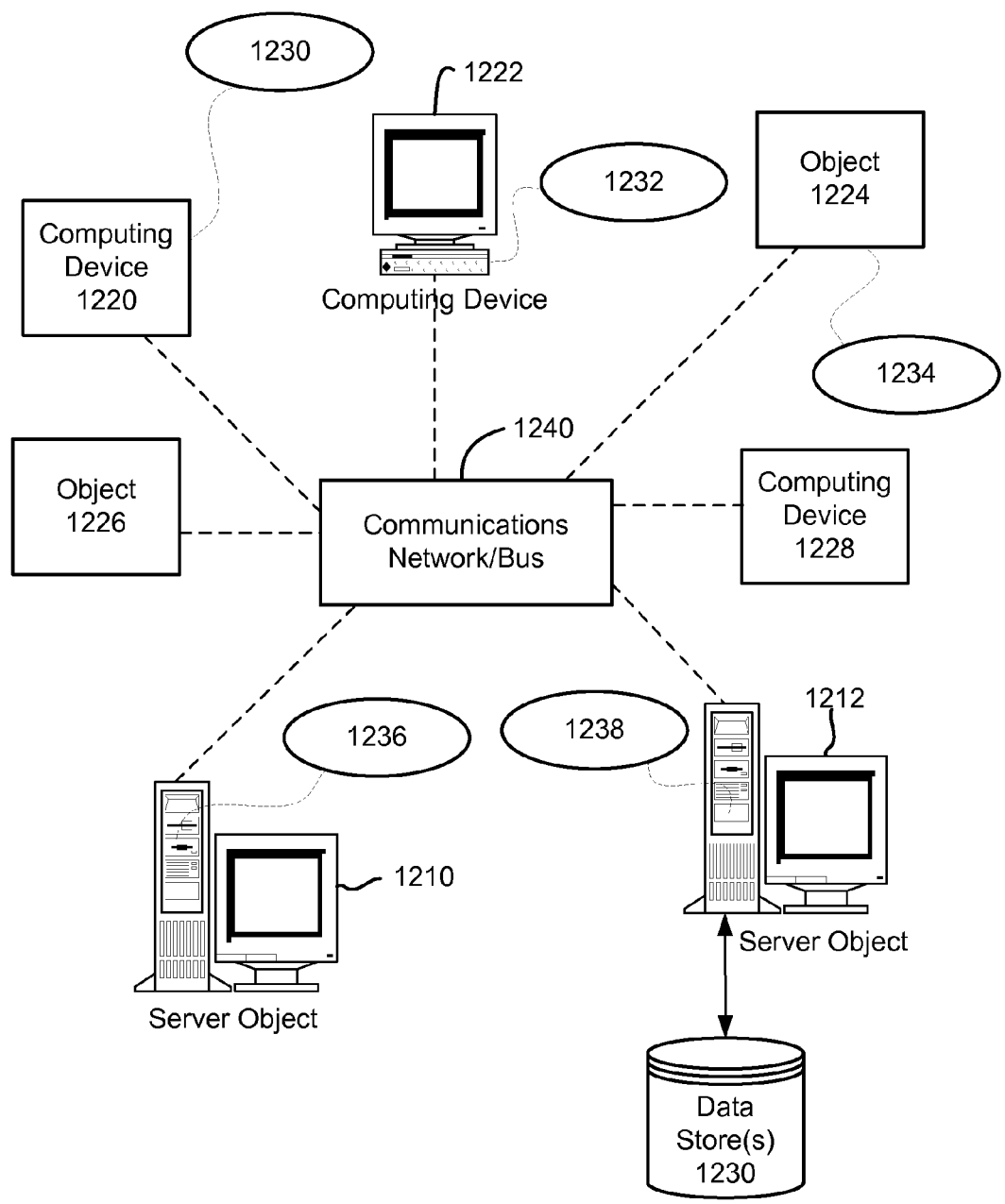
FIG. 12 is a block diagram representing exemplary non-limiting networked environments in which various embodiments described herein can be implemented.

FIG. 12 provides a schematic diagram of an example networked or distributed computing environment. The distributed computing environment comprises computing objects 1210, 1212, etc., and computing objects or devices 1220, 1222, 1224, 1226, 1228, etc., which may include programs, methods, data stores, programmable logic, etc. as represented by example applications 1230, 1232, 1234, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, communications network 1240 may comprise other computing objects and computing devices that provide services to the system of FIG. 12, and/or may represent multiple interconnected networks, which are not shown. Each computing object 1210, 1212, etc. or computing object or device 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1240 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 13 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
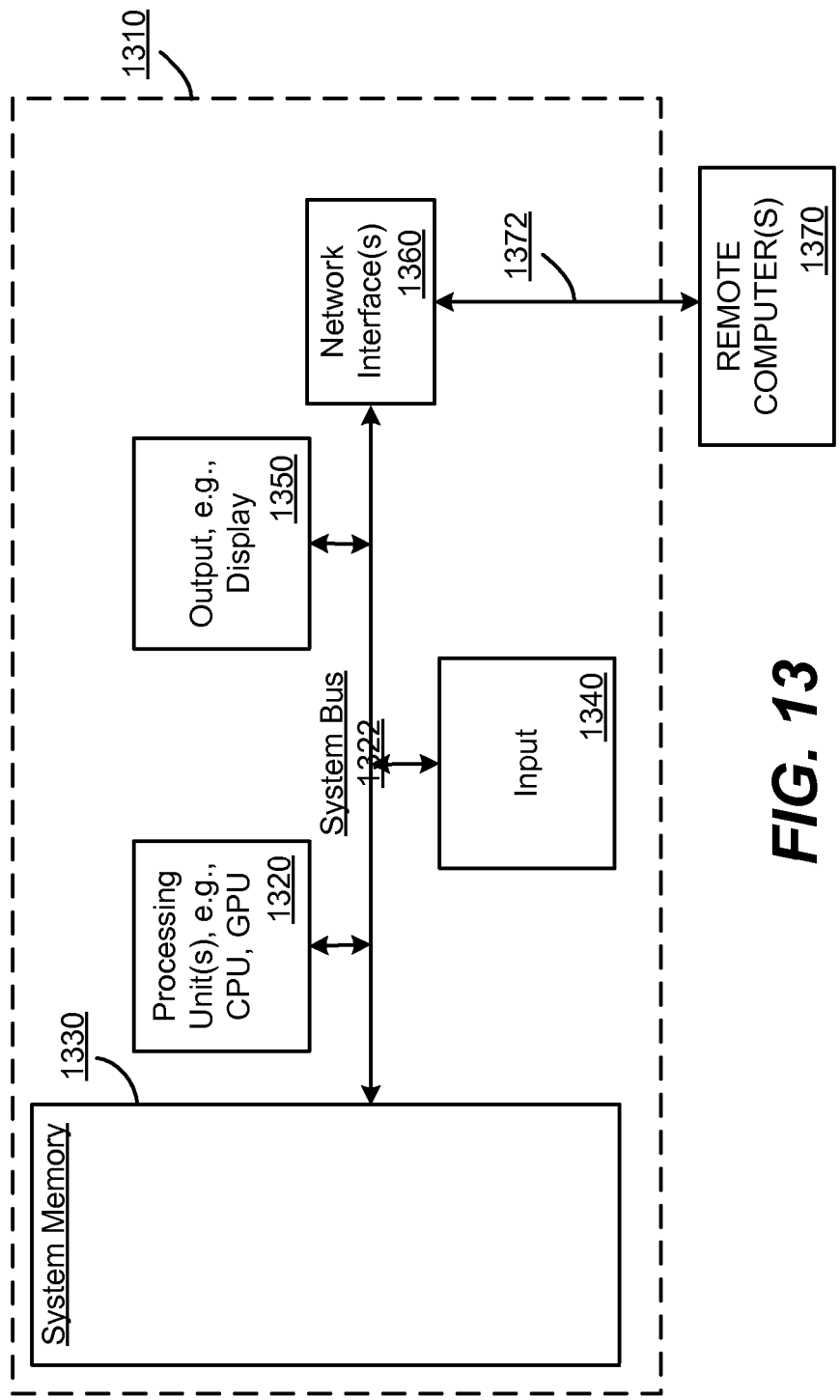
FIG. 13 is a block diagram representing an exemplary non-limiting computing system or operating environment in which one or more aspects of various embodiments described herein can be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the example computing system environment 1300.

With reference to FIG. 13, an example remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for inferring problem data from bug repositories, the method comprising;
   identifying a plurality of phrases that are repeated in a bug report;
   selecting a first phrase from the plurality of phrases to keep and a second phrase from the plurality of phrases to drop based on a meaning of the first phrase being greater in significance in the bug report than a meaning of the second phrase;
   mapping the first phrase to one or more of a plurality of classes of an ontology model associated with the bug report, the ontology model defining valid interactions between the plurality of classes;
   determining whether the first phrase corresponds to a valid interaction defined by the ontology model; and
   based on determining the first phrase corresponds to a valid interaction in the ontology model, generating an output corresponding to the mapping for use in analyzing the bug report.

2. The method of claim 1 further comprising:
   querying a knowledge base using the first phrase; and
   receiving a query response from querying the knowledge base including receiving at least one of: a concept that identifies a problem, an action taken to resolve the problem, an activity performed during troubleshooting of the problem, a series of steps taken to arrive at a solution, or a conversation contained within the bug report.

3. The method of claim 1 further comprising tagging the first phrase with a class from the one or more classes of the ontology model maintained as part of the knowledge base.

4. The method of claim 3 wherein the ontology model maintains class and subclass data in a taxonomy comprising class and subclass nodes, and wherein tagging the first phrase comprises traversing the taxonomy in a direction from a coarse-grained node towards a fine-grained subclass node to identify a node associated with the most fine-grained data for tagging the first phrase.

5. The method of claim 1 further comprising, performing trend analysis based upon the output associated with the bug report and a second output associated with a second bug report.

6. The method of claim 1, wherein generating the output comprises providing the output for use as input to one or more learning algorithms.

7. The method of claim 1 further comprising:
building the knowledge base, comprising:
processing a set of bug reports to add additional phrases to the knowledge base; and
modeling an ontology for maintaining as part of the knowledge base.

8. The method of claim 7, wherein building the knowledge base comprises building a per-domain ontology knowledge base.

9. The method of claim 1 further comprising, using incremental learning to one or more of build the knowledge base and update the knowledge base.

10. The method of claim 1 further comprising ranking the output based upon a similarity metric.

11. A system for inferring problem data from bug repositories, the system comprising:
a memory comprising a knowledge base configured to store phrases that are mapped to classes of an ontology; and
a computing device coupled to the memory, the computing device comprising one or more processors, a query engine coupled to the knowledge base, and a program interface,
wherein, upon execution of the one or more processors, the program interface is configured to:
obtain a bug report;
identify a plurality of phrases that are repeated in the bug report;
select a first phrase from the plurality of phrases to keep and a second phrase from the plurality of phrases to drop based on a meaning of the first phrase being greater in significance in the bug report than a meaning of the second phrase;
map the first phrase to a class of an ontology model having a plurality of classes associated with the bug report, the ontology model defining valid interactions between the plurality of classes;
determine whether the first phrase corresponds to a valid interaction defined by the ontology model; and
based on determining the first phrase corresponds to a valid interaction defined by the ontology model, generate an output corresponding to the mapping for use in analyzing the bug report.

12. The system of claim 11, wherein the knowledge base contains the ontology model, and wherein the plurality of classes of the ontology model comprise one or more of the following: an entity class, an action class, and a condition class.

13. The system of claim 12, wherein the ontology model further comprises at least one of a negation class, an incident class, a sentiment class, or a quantity class.

14. The system of claim 11, wherein the retrieved information comprises at least one of a problem concept, an activity concept, an action concept, a series of steps taken to arrive at a solution, or a conversation contained within the bug report.

15. One or more computer-readable storage devices or memory devices comprising device-readable instructions which, upon execution perform operations comprising:
processing a plurality of bug reports;
identifying a plurality of phrases that are repeated in a bug report from the plurality of bug reports;
selecting a first phrase from the plurality of phrases to keep and a second phrase from the plurality of phrases to drop based on a meaning of the first phrase being greater in significance in the bug report than a meaning of the second phrase;
mapping the first phrase to one or more of a plurality of classes of an ontology model associated with the bug report, the ontology model defining valid interactions between the plurality of classes;
determining whether the first phrase corresponds to a valid interaction defined by the ontology model; and
based on determining the first phrase corresponds to a valid interaction defined by the ontology model, generating an output corresponding to the first phrase.

16. The one or more computer-readable storage devices or memory devices of claim 15, wherein selecting the first phrase further comprises performing pattern extraction on the plurality of bug reports to obtain at least a portion of the first phrase.

17. The one or more computer-readable storage devices or memory devices of claim 15, wherein the device-readable instructions further perform operations comprising:
querying a knowledge base using the first phrase; and
receiving a query response from querying the knowledge base including receiving at least one of: a concept that identifies a problem, an action taken to resolve the problem, an activity performed during troubleshooting of the problem, a series of steps taken to arrive at a solution, or a conversation contained within the bug report.

18. The one or more computer-readable storage devices or memory devices of claim 15 having further device-readable instructions comprising, querying the knowledge base based upon phrases in one or more new bug reports to obtain information based upon the ontology model for analysis.

19. The one or more computer-readable storage devices or memory devices of claim 18 having further device-readable instructions comprising outputting one or more concepts corresponding to the one or more new bug reports.

20. The one or more computer-readable storage devices or memory devices of claim 18 having further device-readable instructions comprising performing trend analysis based upon the information obtained from querying the knowledge base.

* * * * *